(12) United States Patent
Li et al.

(10) Patent No.: US 7,277,472 B2
(45) Date of Patent: Oct. 2, 2007

(54) ESTIMATION METHOD OF FLAT FADING CHANNEL IN CDMA COMMUNICATION SYSTEM AND APPARATUS FOR THE SAME

(75) Inventors: Gang Li, Shenzhen (CN); Yu Jin, Shenzhen (CN); Sheng Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 614 days.

(21) Appl. No.: 10/474,192

(22) PCT Filed: Apr. 16, 2001

(86) PCT No.: PCT/CN01/00556

§ 371 (c)(1),
(2), (4) Date: Oct. 16, 2003

(87) PCT Pub. No.: WO02/091643

PCT Pub. Date: Nov. 14, 2002

(65) Prior Publication Data

US 2006/0062284 A1   Mar. 23, 2006

(51) Int. Cl.
*H04B 1/69* (2006.01)
(52) U.S. Cl. ............... 375/148; 370/320; 375/262; 375/341; 704/242; 714/795; 708/318
(58) Field of Classification Search ............... 375/148, 375/231, 233, 340, 348
See application file for complete search history.

(56) References Cited

U.S. PATENT DOCUMENTS 5,329,547 A * 7/1994 Ling .................. 370/342

FOREIGN PATENT DOCUMENTS

| EP | 0 961 427 | 12/1999 |
|---|---|---|
| EP | 0 963 056 | 12/1999 |
| EP | 0961427 | 12/1999 |
| EP | 0963056 | 12/1999 |
| EP | 1 030 488 | 8/2000 |
| EP | 1030488 | 8/2000 |

OTHER PUBLICATIONS

Satorius, E., Pack, J.;Application of Least Squares Lattice Algorithms to Adaptive Equalization; Feb. 1981; □□IEEE Transactions on Communications; vol. 29, Issue 2; pp. 136-142 □□.*
Ching-Kae Tzou, Raheli, R., Polydoros, A.; Applications of per-survivor processing to mobile digital communications; Nov. 29-Dec. 2, 1993 ; Globecom 1993; pp. 77-81.*

* cited by examiner

*Primary Examiner*—David C. Payne
*Assistant Examiner*—Adolf DSouza
(74) *Attorney, Agent, or Firm*—Oblon, Spivak, McClelland, Maier & Neustadt, P.C.

(57) ABSTRACT

The invention provides a method and apparatus for estimating flat fading channel in CDMA communication system, said method is implemented by using an adaptive forward prediction technique based on lattice filter and maximum likelihood technique of Viterbi algorithm. The adaptive lattice filter is used to carry out prediction of LS criteria on channel fading, and a maximum likelihood detection technique completes Viterbi algorithm in accordance with a channel fading value obtained by the prediction, thus obtaining final estimation and decision about the transmitting signals. The present invention has the advantages that it can obtain accurate result for channel estimation and sequence decision when it operates in the fast fading channel, and overcome fast fading influence due to motion speed up of mobile station, thereby satisfying mobile station speed and corresponding receiving performance required in 3G mobile communication.

6 Claims, 7 Drawing Sheets

PRIOR ART

Fig. 1

PRIOR ART

ESTIMATION METHOD OF FLAT FADING CHANNEL IN CDMA COMMUNICATION SYSTEM AND APPARATUS FOR THE SAME

FIELD OF THE INVENTION

The invention relates to a method and apparatus for estimating flat fading channel in CDMA communication system.

BACKGROUND OF THE INVENTION

In a CDMA communication system, wideband transmitting signals pass frequency selective fading channel during transmission, thus the identifiable multi-paths may be effectively separated at the receiving end. The optimal receiver may be equivalent as performing maximum ratio combination (i.e., coherent RAKE reception) for multiple of multi-path signals with independent flat fading channel (or frequency nonselective channel) characteristics. Accordingly, the issue of frequency selective channel equalization may be simplified to compensation and diversity reception for multiple frequency nonselective channels. In the case of slow fading channel, a traditional coherent receiver has good receiving function. However, in the case of fast fading due to speeding up of mobile station and increasing of carrier frequency, the mobile channel will introduce strong random interference to transmitting signals both in amplitude and phase, thus it is difficult to calculate the impulse response of channel with ordinary coherent detection techniques in such a case. Therefore, some coherent detection (i.e., channel estimation) methods that may adapt to a large range of channel fading shall be developed to detect channel parameters. In fact, in the core technology of WCDMA (Wideband Code Division Multiple Access), channel estimation technique is the core or foundation of many important techniques, such as coherent RAKE reception, coherent trace for spread spectrum code, Signal to Interference Ratio (SIR) measurement in fast transmitting power control (TPC) or Turbo Code, interference suppression technique, decision and back-substitution-based time domain reference adaptive antenna array, etc.

Traditional techniques for estimating flat fading channel are mainly classified into two categories: techniques (e.g., PSAM, PilotTone) with which to estimate fading with known reference signals; and optimal symbol/sequence estimation techniques that are based on statistical signal processing.

Figure 1:
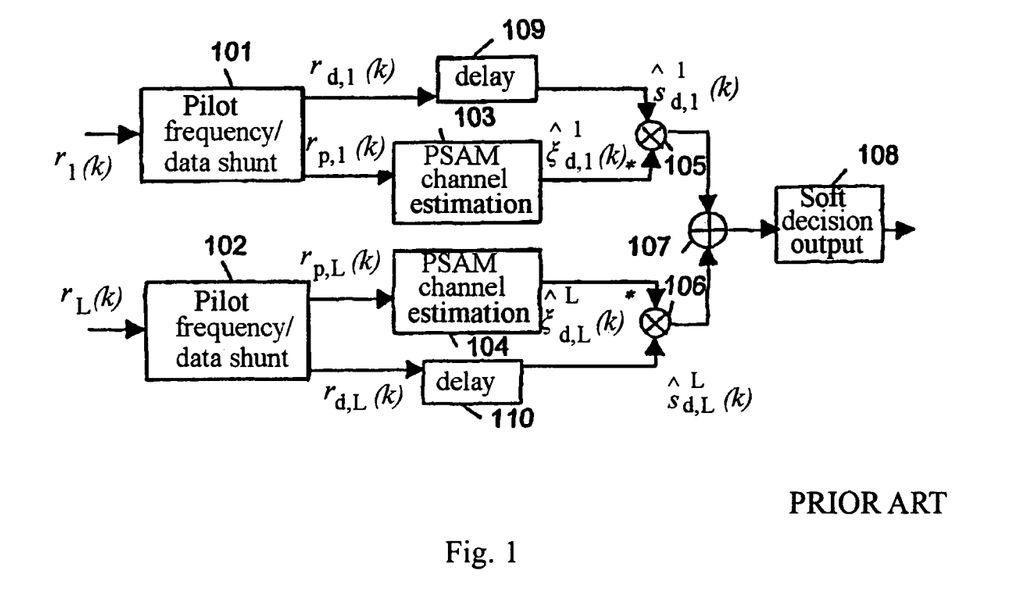
FIG. 1 is a flow diagram of the method that employing traditional interpolation-type channel estimation technique.
Figure 2:
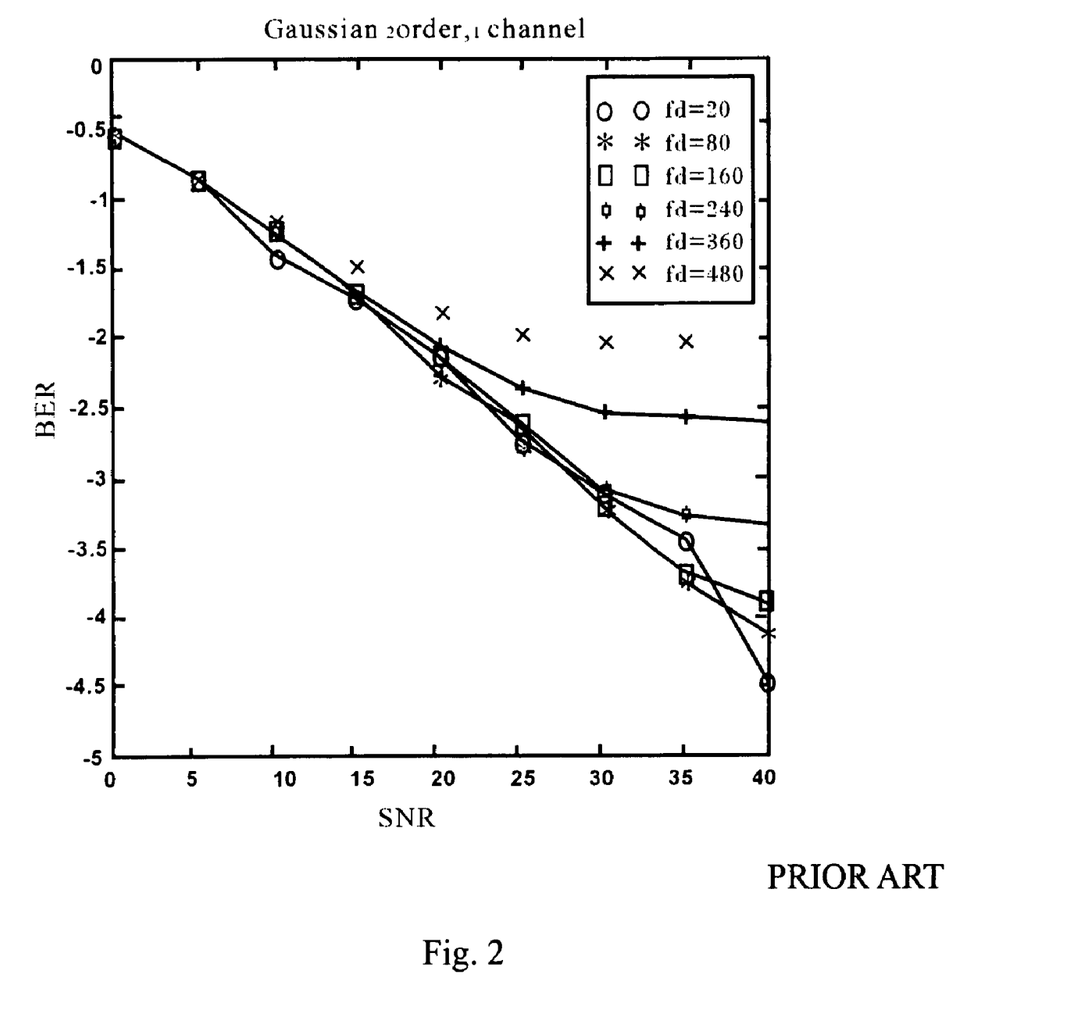
FIG. 2 is a SNR-BER curve diagram at different channel fading Doppler frequencies according to traditional Gauss Second-Order Interpolation method.

Pilot Symbol Assistant Modulation (PSAM) is used in WCDMA system, and uplink CDMA2000 system. According to the technique, pilot symbols are inserted into data stream periodically to estimate the channel, i.e., it is an interpolation-type channel estimation technique. The insertion frequency of pilot symbols should meet Nyquist sampling rate for fading courses. In the case of low fading rate, PSAM can deliver both good estimation performance and simplicity. FIG. 1 is a structure diagram of a receiver implemented according to above method. Said receiver comprises: pilot frequency/data shunt units 101, ... 102, channel estimation units 103, ... 104, multiplier units 105, ... 106, adder unit 107, output unit 108, and delay units 109, ... 110. The reciever signals $r_1(k)$ ... $r_L(k)$ enter corresponding pilot frequency/data shunt units 101, ... 102 respectively; the output pilot symbols are sent to PSAM channel estimation units 103, ... 104, and the channel information $\xi_{d,1}(k), \ldots, \xi_{d,L}(k)$ corresponding to data code part of every path is calculated with interpolation method and like; data codes output from the other exits of the pilot frequency/data shunt units 101, ... 102 pass through delay units 109, ... 110 and then are multiplied in conjugation with above estimated channel values at the multiplier units 105 and 106, and then are added at the adder unit 107, finally, they pass the soft decision output unit 108 to the subsequent decoding part. FIG. 2 shows the Bit Error Rate (BER) curve of a preferable Gauss Second-Order Interpolation Method at several typical Doppler frequencies. It is observed that the methods can satisfy performance requirement in the case of slow fading channel; however, as channel-fading rate accelerates and channel properties vary significantly within just several time slots, such methods can't trace channel variations ideally.

Increasing performance will be required in future mobile communication systems. In particular the higher speed the mobile station has, the severer the variation of channels. In the case of fast fading channels, statistical signal processing-based optimal symbol/sequence estimation technique has obvious advantages. Such methods may be classified into MAP symbol-to-symbol detection techniques and MLSE-based sequence estimation techniques. Though known pilot symbols are needed according to this method, the pilot symbols are only used to provide phase reference necessary for coherent demodulation as well as to prevent accumulative misjudging effect when using decision directed feedback and back-substitution to reduce computing complexity. Therefore, methods like this don't require the insertion frequency of pilot symbols to meet the requirement of Nyquist rate for sampling during fading, thus more accurate channel utilization ratio and channel parameter estimation values at high fading rate can be obtained, compared to PSAM technique. Because that WCDMA delivers 2 GHz RF frequency and supports mobile station with the speed up to 500 Km/s, and the pilot symbols are inserted in at a time slot interval of about 0.667 ms, such a channel estimation technique has to be used. In fact, if the speed of the mobile station is very high, even though the pilot symbols meet the requirement of Nyquist rate, to ensure the interpolation filter has adequate bandwidth and excellent in-band suppression and out-band attenuation, a higher order interpolation filter has to be used, which may result in a long delay and a large amount of calculations. On the other hand, the amount of calculations of the latter method may be reduced enormously with fewer sequence states and reasonable decision and back-substitution. Currently, the Viterbi decoding sequence detection method that utilizes linear prediction filter to estimate channels or the adaptive differentiation-based Viterbi algorithm described in some literatures is an implementation of the techniques. However, linear prediction filter requires prior knowledge about the statistical properties of the channels to calculate its coefficient, which is difficult to do in practice; the adaptive differentiation-based Viterbi algorithm is very sensitive to Doppler frequency expansion, thus the flooring effect of error rate may appear. In conclusion, traditional techniques are difficult to use in real systems. Furthermore, traditional methods consider little about hardware feasibility.

In response to channel estimation for fast fading channel and transmitting sequence detection, the object of the present invention is to provide a practical and feasible method and apparatus for estimating flat fading channels in CDMA system, wherein said method and apparatus is based on optimal sequence estimation for statistical signal processing and may eliminate the influence of fast fading channel.

SUMMARY OF THE INVENTION

The technical solution of the present invention is: a method for estimating flat fading channel in CDMA communication system, wherein: it is implemented with adaptive lattice filter-based adaptive forward prediction technique and maximum likelihood detection technique of Viterbi algorithm, said adaptive lattice filter is used to predict channel fading according to LS rule, said maximum likelihood detection technique is used to perform Viterbi algorithm according to the value of predicted channel fading, and thus estimation and determination for transmitted signal can be finished, said method comprising the following steps:

a. inputting a despreaded channel signal corresponding to each transmission path to a respective one of adaptive lattice filters of the receiver and calculating the estimated value of received signal corresponding to the node at time n;

b. adding together measurement result of branch metric corresponding to each transmission path to obtain the survived paths at time n;

c. demodulating the signal estimation result obtained from the survived paths according to corresponding received signals to obtain estimated value of channel fading at time n;

d. adjusting coefficient of each of the adaptive filters and then estimating the channel at time n+1;

e. repeating steps a~d till all survived paths converge into one path at the pilot symbol of the time slot, the phase corresponding to the nodes in said path is the phase estimation result for the transmitted signals.

A method for estimating flat fading channels in CDMA communication system as described above, wherein the estimated values for received signal corresponding to said node at time n in above step a is an estimated value for the channel at time n, which is calculated according to the nodes in the transmission paths at time n−1.

A method for estimating flat fading channels in CDMA communication system as described above, wherein said branch metric in step b is the sum of squares of errors between estimated values and actual values of received signals in paths between nodes from time n−1 to time n.

A method for estimating flat fading channels in CDMA communication system as described above, wherein said survived paths at time n in said step b are obtained by adding branch measuring results corresponding to the transmission paths to calculate the path metric of each node at time n, then performing Viterbi algorithm operations (add, compare, and select) to obtain the survived paths at time n.

A method for estimating flat fading channels in CDMA communication system as described above, wherein the coefficient of each of the adaptive filters is adjusted in said step d according to the estimation error between the estimated value of channel fading at time n and the value of channel fading at time n predicted at time n−1.

An apparatus for implementing said method is a receiver comprising a channel equalization apparatus, wherein: said channel equalization apparatus is an adaptive lattice filter comprising a delay unit, a multiplier unit, a lattice filtering channel prediction unit, a branch metric-computing unit, an adder unit, and a Viterbi decoding unit; despreaded signals are input to the channel equalization apparatus; in the lattice filtering channel prediction unit, the value of received signal at the node at time n is estimated according to the channel value at time n, which are estimated according to the nodes in the transmission paths at time n−1; in the branch metric calculating unit, the square of the error between the estimated value and the actual value of received signal is used as branch metric in paths between the nodes from time n−1 to time n; in the adder unit, the branch measuring results corresponding to the transmission paths are added together to calculate the path metric of each node at time n; in the Viterbi decoding unit, Viterbi algorithm operations (add, compare, and select) are performed to obtain the survived paths; the symbol estimation values for the survived paths are used to demodulate the next received signal in the multiplier unit; channel estimation for time n+1 is performed in the RLS lattice filtering channel prediction unit, till all survived paths converge into one path at the pilot symbol of the time slot, and the phase corresponding to the nodes in the path is the estimated phase value for the transmitted signals.

With said technical solution in the present invention, accurate channel estimation and sequence decision results and exhibits excellent tracing effect in the case of fast fading channel can be obtained, and makes it possible to eliminate the influence of fast fading resulted from mobile station speeding up and to satisfy the requirements of 3G mobile communication for speed of mobile station and corresponding receiving performance. The equalizing apparatus can be used in uplink and downlink receivers in CDMA cellular system that employs PSAM technique.

BRIEF DESCRIPTION OF THE DRAWINGS

To understand the properties, features and merits of the invention, the invention is described in further detail in the following embodiments with reference to the attached drawings.

DETAILED DESCRIPTION OF THE EMBODIMENTS

A method for estimating flat fading channel in CDMA communication system, wherein: it is implemented by using adaptive lattice filter-based adaptive forward prediction technique and maximum likelihood detection technique of Viterbi algorithm; said adaptive lattice filter is used to predict channel fading according to LS rule, said maximum likelihood detection technique is used to perform Viterbi algorithm according to the value of predicted channel fading, and thus estimation and determination for transmitted signal can be finished, said method comprises the following steps:

a. input despreaded channel signals to adaptive lattice filter of the receiver to calculate the estimated value of received signals corresponding to the node at time n;
b. add together measurement results of branch metrics corresponding to the transmission paths to obtain the survived paths at time n;
c. demodulate the signal estimation result obtained from the survived paths according to corresponding received signals to obtain estimated value of channel fading at time n;
d. adjust coefficient of the adaptive filter, and then estimate the channel at time n+1;
e. repeat steps a~d till all survived paths converge into one path at the pilot symbol of the time slot, the phase corresponding to the nodes in said path is the phase estimation result for the transmitted signals.

Figure 4:
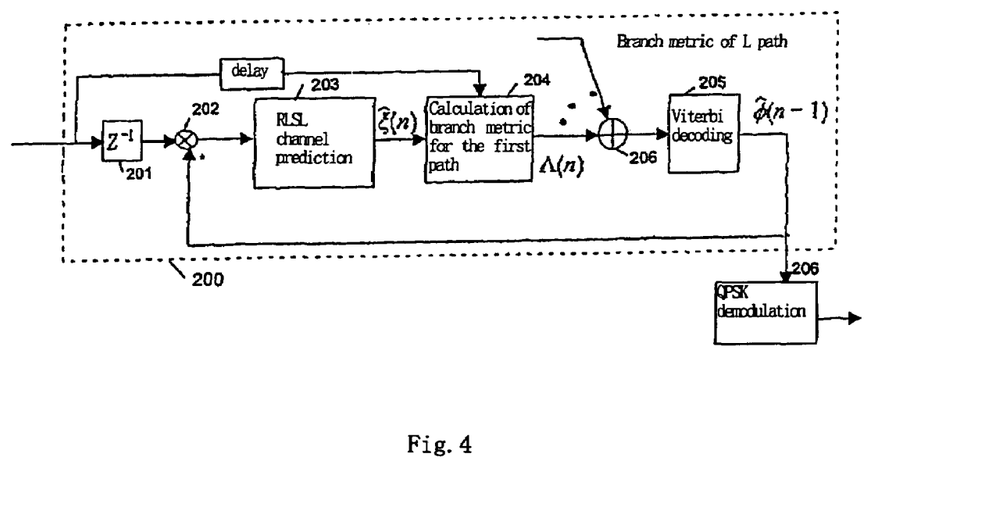
FIG. 4 is a structured flowchart of adaptive channel prediction—MLSE sequence detection techniques of the lattice filter according to the present invention.

FIG. 4 is a block diagram of the detection receiver according to the present invention, the receiver employs adaptive lattice filter-based adaptive forward prediction technique and per-survivor processing principle (PSPP)-based technique and maximum likelihood detection technique of Viterbi algorithm. said adaptive lattice filter is used to predict channel fading according to LS rule, said maximum likelihood detection technique is used to perform Viterbi algorithm according to the value of predicted channel fading, and thus estimation and determination for transmitted signal can be finished. When the transmitted baseband signals are represented with their MPSK modulation phase, every possible value of the transmitted signals at each point of time constitutes a node in Viterbi decoding grid chart at that time. Said receiver comprises a channel equalization apparatus, which is a RLS lattice filter and said RLS lattice filter comprises a delay unit 201, a multiplier unit 202, a RLS lattice filtering channel prediction unit 203, a branch metric-calculating unit 204, an adder unit 206, and a Viterbi decoding unit 205.

The despreaded signals are input to the channel equalization apparatus 200 in the present invention; in the RLS lattice filtering channel prediction unit 203 and other units corresponding to parallel paths (finger), the estimated value of received signal corresponding to the node $\hat{\phi}_n$ at time n can be obtained according to the value $\hat{\eta}_{1,n}(\hat{\phi}_{n-1})$ for the channel at time n estimated at node $\hat{\phi}_{n-1}$ at time n−1; in the branch metric calculating unit 204, the sum of square of said estimated value and square of the error of actual received signal is used as the branch metric in the paths between node $\hat{\phi}_{n-1}$ and $\hat{\phi}_n$ from time n−1 to time n; in the adder unit 206, the branch metric results of the transmission paths are added together to calculate the path metric of each node at time n; then, in the Viterbi decoding unit 205, Viterbi algorithm operations (add, compare, and select) are performed to obtain the survived path; next, the symbol estimation values for the survived paths are used to demodulate the next received signal in the multiplier unit 202; then the channel at $\hat{\phi}_{n+1}(\hat{\phi}_n)$ at time n+1 is estimated at the RLS lattice filtering channel prediction unit 203; repeat said steps till all of the survived paths converge into one path at the pilot symbol of the time slot ultimately, and the phase corresponding to the nodes in said path is the estimated phase value of the transmitted signals. According to the embodiment, excellent channel estimation and sequence decision results are obtained. Therefore, said equalization apparatus can be used in uplink and downlink receivers that employ PSAM technique in CDMA cellular system.

Figure 5:
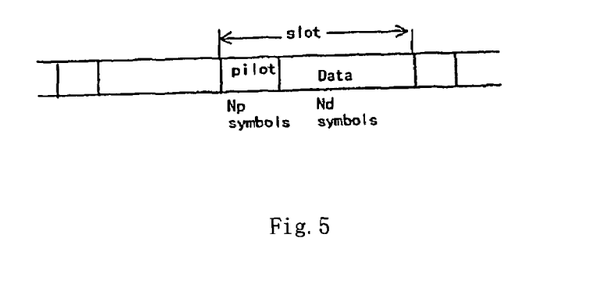
FIG. 5 is a structural diagram of time slots of PSAM transmission channel.

The method and apparatus according to the present invention will be described with reference to another embodiment. Suppose as a single user system, transmitted signals are QPSK modulated, intermittent pilot frequency format is used in channel time slots, length of each time slot Tslot= (Np+Nd)T, wherein 'T' is the duration of a single symbol, 'Nd' is the length of data symbol, Np is the length of pilot symbol. The structure of time slot is shown in FIG. 5.

Suppose the multi-path channel comprises L-path separate transmission paths (L=0, 1, . . . , L−1), the received signals may be:

$$r(kT) = \sum_{l=0}^{L-1} \xi_l(kT) s(kT - \tau_l) + n_l(kT) \quad (1)$$

Wherein n (t) is background noise and may be considered as additive Gaussian white noise, the density of one sided power spectrum is $N_0$; $\xi_{1(t)}$ and $\tau_1$ are gain and delay of a plurality of channels in path 1 respectively; s(t) is corresponding baseband signal transmitted; L is the number of channel paths received.

Maximum likelihood detection:

Suppose N symbols are transmitted and the corresponding phase sequence is $\phi=(\phi_0, \phi_1, \ldots, \phi_{n-1})$ (N is sequence length), for given $\phi$ and channel gain $\xi$, $\xi=\{\xi_{1,n}=0, 1, \ldots, L-1, n=0, 1, 2, \ldots, N-1\}$ (L is the number of channel paths of received signals), the joint probability density function of the sequence of received signals $r=\{r_{1,n}; 1=0, 1, \ldots, L-1, n=0, 1, 2, \ldots, N-1\}$ may be:

$$p(r \mid \phi, \xi) = \frac{1}{(2\pi N_0/T)^{LN}} \times \exp\left[ \frac{-\sum_{n=0}^{n-1} \sum_{l=0}^{L-1} |r_{1,n} - \xi_{1,n} \exp j\phi_n|^2}{2N_0/T} \right] \quad (2)$$

Wherein $N_0$ is one sided power spectrum density of Gaussian white noise.

Maximum likelihood detection is to decide the sequence of transmitted signals $\hat{\phi}=(\hat{\phi}_0, \hat{\phi}_1, \ldots, \hat{\phi}_{N-1})$ that makes $$-\sum_{n=0}^{n-1} \sum_{l=0}^{L-1} |r_{1,n} - \xi_{1,n} \exp j\phi_n|^2.$$

Figure 3:
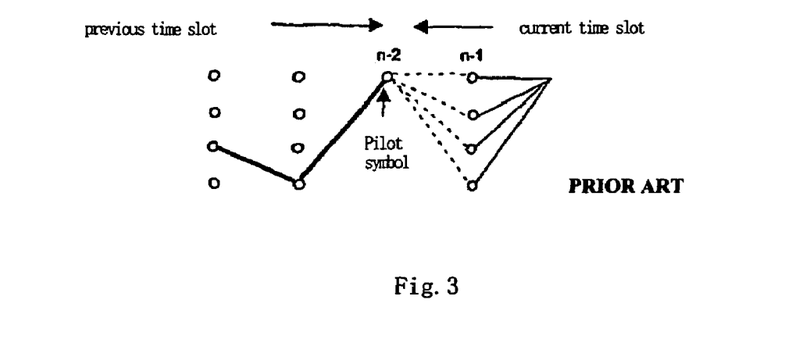
FIG. 3 is a grid chart of traditional OPSK sequence.

To effectively solve the minimum limit problem in maximum likelihood detection, here we employ a four-state Viterbi algorithm for QPSK signals. In the grid chart of Viterbi algorithm (referring to FIG. 3), each node represents a point in the four-state signal planisphere. The collection of the states and the variation from one moment to the next moment constitute the four-state grid chart. In practice, $\xi_{1,n}$ in equation (1) is unknown and must be replaced by its estimated value $\hat{\xi}_{1,n}$, for example, the RLSL adaptive forward prediction for channel estimation that will be described hereafter is used to complete the estimation of the channel fading coefficient $\xi_{1,n}$ for all grid nodes at a moment. Here, the estimated value obtained at node $\hat{\xi}_{1,n}$ is represented as $\hat{\xi}_{1,n}(\hat{\phi}_{1,n})$. The branch metric from node $\hat{\phi}_{n-1}$ to node $\hat{\phi}_n$ is calculated as follows:

$$\lambda(\bar{\phi}_{n-1} \rightarrow \bar{\phi}_n) = \sum_{k=0}^{L-1} |\gamma_{l,n} - \hat{\xi}_{l,n}(\bar{\phi}_{n-1})\exp j\bar{\phi}_n|^2 \quad (3)$$

The path metric corresponding to node $\hat{\phi}_n$ is:

$$\Lambda(\hat{\phi}_n) = \Lambda(\hat{\phi}_{n-1}) + \lambda(\hat{\phi}_{n-1}) \rightarrow \hat{\phi}_n) \quad (4)$$

The operations of metric comparison and selection of survived paths described hereafter are identical to the operation of Viterbi algorithm in convolutional code decoding.

At the end of each time slot, the phase of pilot signal of a symbol is preset and is used as the end tag so that only one survived path in the entire grid chart is reserved. The phase values of the nodes in this path are regarded as the estimated phases of the transmitted signals in that time slot. Suppose the length of time slot symbol is D, the Viterbi receiver output once every D symbols.

Implement channel prediction with RLS lattice filter: the optimal channel estimation filter shall adjust itself dynamically along with channel variation. Therefore, in order to obtain good channel estimation in different environments, recursive least square (RLS) adaptive lattice filters are used as the channel estimation filter in the present invention. Such a filter has superior performance.

Figure 6:
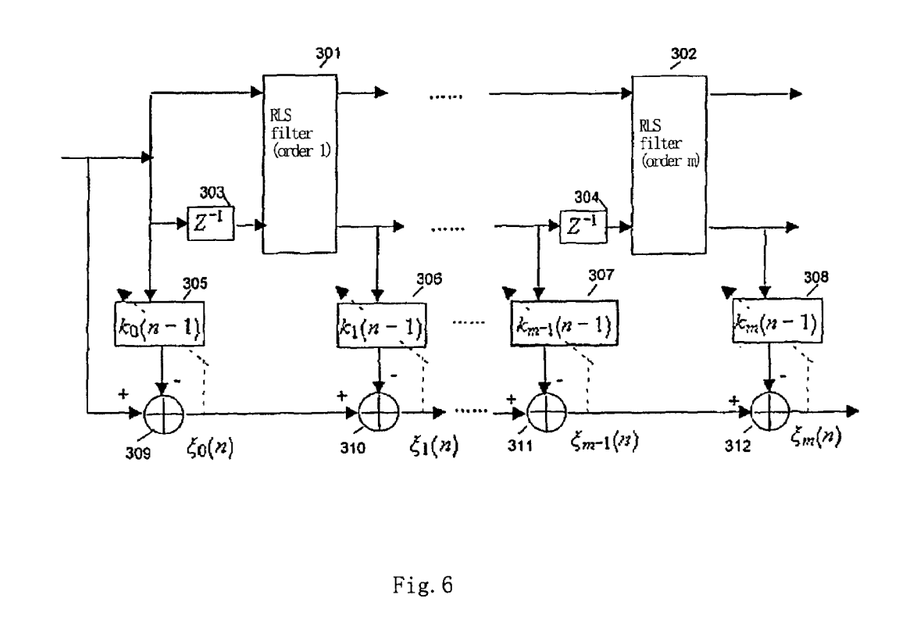
FIG. 6 is a block diagram of the RLSL adaptive filter according to the present invention.

FIG. 6 is a block diagram of the RLS lattice adaptive filter. $\{\hat{\xi}_0(n), \hat{\xi}_1(n), \ldots, \hat{\xi}_m(n)\}$ are estimated values of channel fading coefficients, which is output from orders of lattice filters. The received signals $r_1(n)$ at time n pass m orders of RLS filters 301 and 302 and delay units 303 and 304, and all orders of forward and backward prediction errors $\{e_0^f(n), \ldots, e_m^f(n)\}$, $\{e_0^b(n), \ldots, e_m^b(n)\}$ are output, wherein the backward prediction errors pass m orders of adaptive filters, the coefficients $k_1(n-1)$, ($l=0, \ldots, m$) 305, 306, 307, 308 of the adaptive filters are adaptively adjusted according to the forward and backward prediction errors $e_1^f(n), e_1^b(n)$ created by corresponding orders of the adaptive filters at last time, and the outputs of individual order of the adaptive filters are the estimated values of channel fading coefficients $\{\hat{\xi}_0(n), \hat{\xi}_1(n), \ldots, \hat{\xi}_m(n)\}$ of all phases of RLS lattice filters.

For a survived path $\{\hat{\phi}_{n-1}, \hat{\phi}_{n-2}(\hat{\phi}_{n-1}), \ldots, \hat{\phi}_{n-m}(\hat{\phi}_{n-1}), \ldots\}$, transmitted signals $\{\hat{s}(n-1), \hat{s}(n-2), \ldots, \hat{s}(n-m)\}$ (wherein $\hat{s}(n-k)=\exp j\hat{p}_{n-k}$) are retrieved from $\{\hat{\phi}_{n-1}, \hat{\phi}_{n-2}(\hat{\phi}_{n-1}), \ldots, \hat{\phi}_{n-m}(\hat{\phi}_{n-1}), \ldots\}$, conjugated, and multiplied with corresponding received signals $r_1(n-1), r_2(n-2), \ldots, r_1(n-m)$ to obtain the estimated value (with noise) of channel fading from time n−1 to time n−m:

$$\mu_1(n-k)=r_1(n-k)\hat{s}^*(n-k)=\xi(n-k)+n'(n-k), k=1, \ldots, m \quad (5)$$

Wherein $n'(n-k)=n(n-k)^*(n-k)$ $\mu_1(n-k)$ is the estimated value of channel fading expected from RLSL at time n−k, and the error between it and the value of channel fading at time n−k predicted by RLSL is the estimated error, which is used to adjust the coefficient of the adaptive filter. Whenever the Viterbi decoding grid chart extends an order of nodes, the $\mu_1(n)$ at a new moment will be loaded into RLSL, and the coefficients of the filters are refreshed, in order to calculate the estimated value $\hat{\xi}_{1,n}(\hat{\phi}_{n-1})$ for channel fading at the next moment. Then, the estimated value is sent to the branch metric calculation and Viterbi decoding parts to obtain the estimated value of the phase $\hat{\phi}_n$ of corresponding transmitted signal, and the process is repeated.

In present invention, forward prediction with adaptive RLS lattice filter technique is used for channel estimation. RLSL method is based on the minimum mean square error Criteria and doesn't require prior knowledge about channel variation characteristic. The lattice filter has the following advantages:

1. A m-order lattice filter can deliver m transversal filter outputs ranging from order 1 to order m, thus the optimal order may be selected dynamically in a changing environment;

2. The lattice filter has advantages including quick convergence and stability (robustness);

3. A m-order lattice filter comprises m modules with the same structure, thus it may facilitate high-speed parallel processing and hardware implementation of VLSI;

4. The lattice filter is Relatively insensitive to rounding error, thus it is well suited for actual digital signal processing systems.

Figure 7:
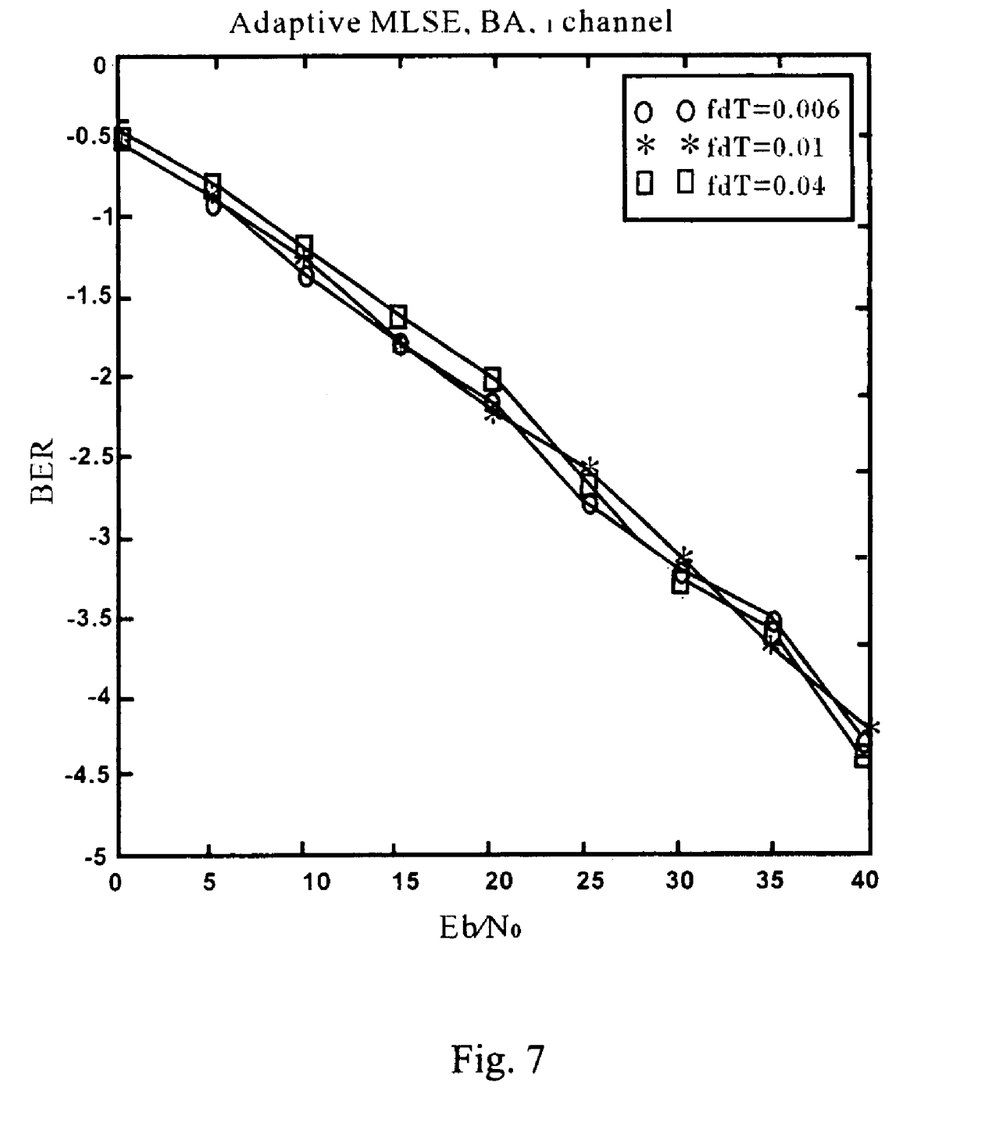
FIG. 7 is an SNR-BER curve diagram of the RLSL adaptive prediction—MLSE sequence detection channel estimation method at different channel fading Doppler frequencies.
Figure 8A:
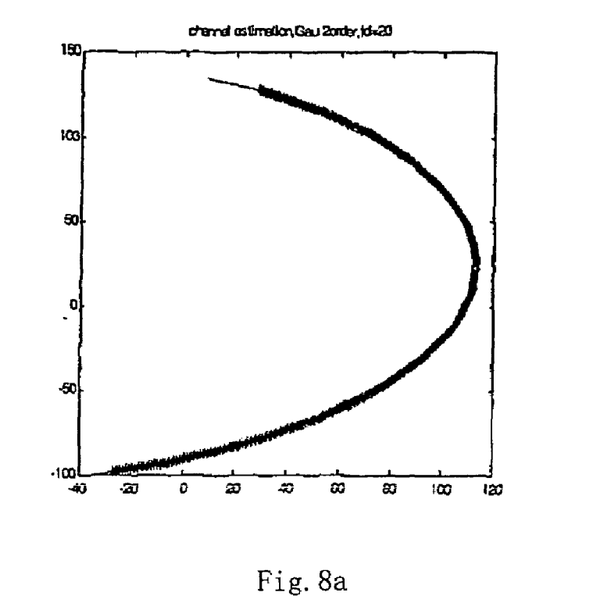
FIGS. 8a and 8b are diagrams of fading channel tracing with traditional Gauss Second-Order Interpolation method when $f_dT_{slot}$=0.0125, 0.4, respectively.
Figure 8B:
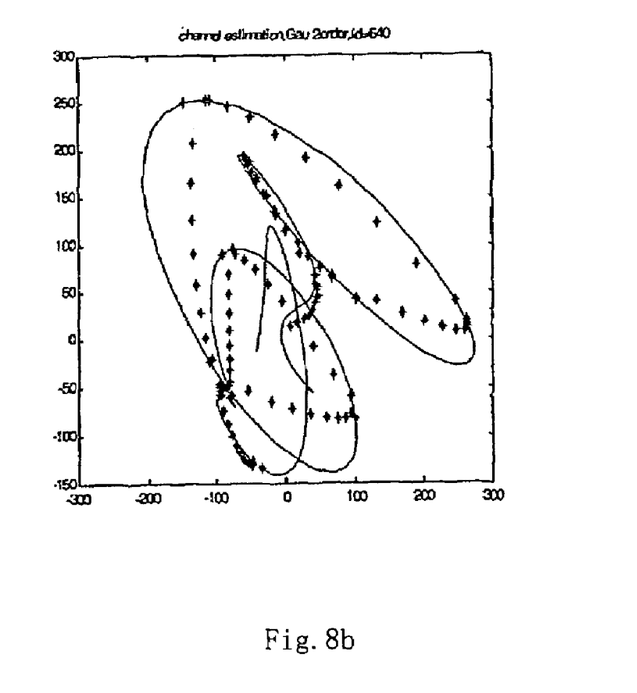
Figure 9A:
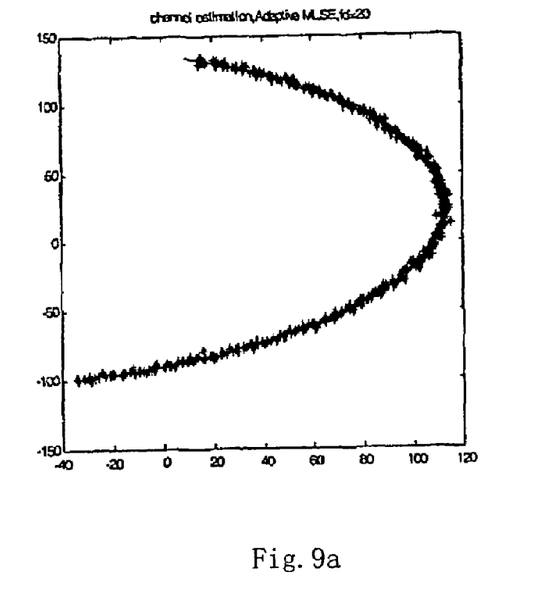
FIG. 9a and FIG. 9b are diagrams of fading channel tracing with RLSL adaptive prediction—MLSE sequence detection channel estimation method when $f_dT_{slot}$=0.0125, 0.4, respectively.
Figure 9B:
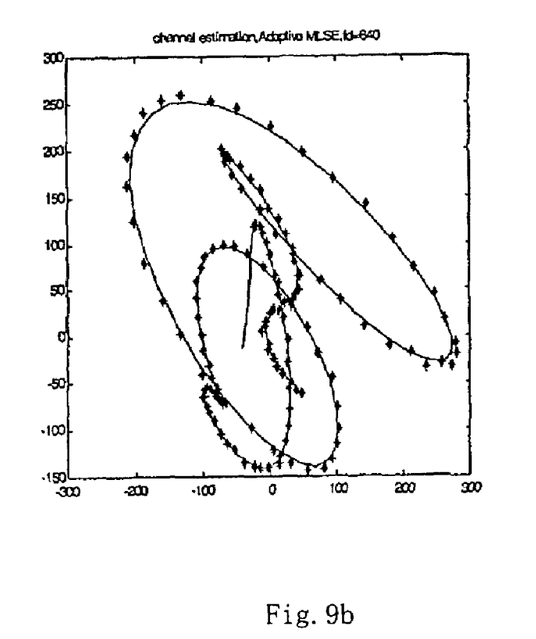

FIG. 7 shows SNR-BER curves of the channel estimation method utilizing RLSL adaptive prediction—MLSE sequence detection technique at several channel fading Doppler frequencies. It is observed that in the case of low fading rate, the performance of this method is similar to Second-Order Gaussian Interpolation channel estimation method; however, in the case of fast channel fading, flooring phenomenon will occur in the BER curves of interpolation methods, causing interpolation methods invalid; but the BER of the present invention still can meet the challenge. FIGS. 8a, 8b and FIGS. 9a, 9b are diagrams of trace-ability of second-order Gaussian interpolation methods and RLSL adaptive prediction—MLSE sequence detection channel estimation method, respectively. It is observed that in the case of relatively low channel fading ($f_d T_{slot}=0.0125$), both of them can reflect similar actual channel capability; however, when the channel varies fast ($f_d t_{slot}=0.4$, Second-Order Gaussian Interpolation method is no longer suitable, but RLSL adaptive prediction MLSE method still exhibits favorable channel variation tracing capability.

INDUSTRIAL APPLICABILITY

The equalizing apparatus in the present invention can works in case of fast fading channels, and it eliminates fast fading influence resulted from mobile station speeding up and can satisfy requirement of 3G mobile communication for the speed of mobile station.

What is claimed is:

1. A method for estimating a flat fading channel in a CDMA communication system, said method comprising:
   a. inputting a despreaded channel signal corresponding to each transmission path to a respective one of an adaptive lattice filter of a receiver and calculating an estimated value of a received signal at a node n at time n, wherein said respective one of the adaptive lattice filter is used to predict channel fading according to LS rule;
   b. adding together a measurement result of a branch metric corresponding to each transmission path and obtaining survived paths at time n by using a maximum likelihood detection technique to perform a Viterbi algorithm according to a value of predicted channel fading;
   c. demodulating a signal estimation result obtained from the survived paths according to corresponding received signals to obtain an estimated value of a channel fading at time n;
   d. adjusting a coefficient of each of the adaptive filters, and then estimating a channel at time n+1; and e. repeating steps a~d till all survived paths converge into one path at a pilot symbol of a time slot, wherein a phase of the nodes in said transmission path corresponds to an estimated phase value for transmitted signals.

2. The method for estimating flat fading channel in CDMA communication system according to claim 1, wherein:
the estimated values for the received signal corresponding to said node at time n in step a is an estimated value for the channel at time n, which is calculated according to nodes in the transmission paths at time n−1.

3. The method for estimating flat fading channel in CDMA communication system according to claim 1, wherein:
said branch metric in step b is a sum of squares of errors between estimated values and actual values of received signals in paths between nodes from time n−1 to time n.

4. The method for estimating flat fading channel in CDMA communication system according to claim 1, wherein wherein said step b comprises:
obtaining said survived paths at time n by adding branch measuring results corresponding to the transmission paths, calculating a path metric of each node at time n, and then performing Viterbi algorithm operations, including at least one of add, compare, and select.

5. The method for estimating flat fading channel in CDMA communication system according to claim 1, wherein step d comprises
adjusting the coefficient of each of the adaptive filters according to an estimation error between an estimated value of channel fading at time n and a value of channel fading at time n predicted at time n−1.

6. An apparatus for estimating a flat fading channel in a CDMA communication system, comprising:
a receiver comprising a channel equalization apparatus, wherein:
said channel equalization apparatus is an adaptive lattice filter comprising a delay unit, a multiplier unit, a lattice filtering channel prediction unit, a branch metric-computing unit, an adder unit, and a Viterbi decoding unit;
the channel equalization apparatus is configured to receive despread signals;
the lattice filtering channel prediction unit is configured to estimate a value of a received signal at a node n at time n according to a channel value at time n, which is estimated according to nodes in a transmission path at time n−1;
the branch metric calculating unit is configured to use a square of an error between the estimated value and an actual value of a received signal as a branch metric in paths between the nodes in the transmission path from time n−1 to time n;
the adder unit is configured to add together branch metric results corresponding to each transmission path to calculate a path metric of each node at time n;
the Viterbi decoding unit is configured to perform Viterbi algorithm operations, including at least one of add, compare, and select, to obtain survived paths;
the multiplier unit is configured to use symbol estimation values of the survived paths to demodulate a next received signal; and
the lattice filtering channel prediction unit is configured to perform channel estimation for time n+1 till all survived paths converge into one path at a pilot symbol of a time slot,
wherein a phase of the nodes in the transmission path corresponds to an estimated phase value for transmitted signals.

* * * * *